US006334367B1

(12) United States Patent
Hatakeyama et al.

(10) Patent No.: US 6,334,367 B1
(45) Date of Patent: Jan. 1, 2002

(54) PARALLEL SHAFT TRANSMISSION

(75) Inventors: Kazuma Hatakeyama; Shouji Asatsuke, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/494,943

(22) Filed: Feb. 1, 2000

(30) Foreign Application Priority Data

Feb. 3, 1999 (JP) ........................................ 11-026009

(51) Int. Cl.[7] .................................... F16H 3/08
(52) U.S. Cl. .................................... 74/331
(58) Field of Search ........................... 74/331, 333

(56) References Cited

U.S. PATENT DOCUMENTS

| | | | | |
|---|---|---|---|---|
| 523,870 A | * | 9/1894 | Hatakeyama | 74/331 |
| 3,318,168 A | * | 5/1967 | Castelet | 74/331 |
| 4,392,391 A | * | 7/1983 | Jameson et al. | 74/333 |
| 5,184,522 A | * | 2/1993 | Nordkvist | 74/331 X |
| 5,186,065 A | * | 2/1993 | Downs | 74/331 |
| 5,471,892 A | * | 12/1995 | Sherman | 74/331 X |
| 5,906,132 A | * | 5/1999 | Janiszewski | 74/331 |
| 6,023,987 A | * | 2/2000 | Forsyth | 74/331 |
| 6,186,029 B1 | * | 2/2001 | McQuinn | 74/331 |

FOREIGN PATENT DOCUMENTS

| | | |
|---|---|---|
| JP | 4-331852 | 11/1992 |
| JP | 5-272601 | 10/1993 |
| JP | 7-19295 | 1/1995 |

* cited by examiner

*Primary Examiner*—Charles A Marmor
*Assistant Examiner*—Roger Pang
(74) *Attorney, Agent, or Firm*—Arent Fox Kintner Plotkin & Kahn, PLLC

(57) ABSTRACT

A compact transmission comprises a first input shaft 1, a second input shaft 2 and a counter shaft 3, which are disposed parallel with one anther. This transmission further comprises at least a set of first speed ratio gear train 25*a,* 25*b,* 24*a,* 24*b,* 26*a,* 26*b* and 26*c,* which are disposed between the first input shaft 1 and the counter shaft 3, at least one first clutching means 15 and 14 which connects and disconnects a first speed ratio drive gear rotationally to and from the first input shaft, respectively, at least a set of second speed ratio gear train 22*a,* 22*b,* 21*a,* 21*b,* 23*a* and 23*b,* which are disposed between the second input shaft 2 and the counter shaft 3, at least one second clutching means 12, 11 and 13 which connects and disconnects a second speed ratio drive gear to and from the second input shaft, respectively, and a connection gear train 30 which is used for power transmission from the first input shaft to the second input shaft through gears 32 and 33 on an idle shaft that is disposed parallel with the first input shaft.

5 Claims, 13 Drawing Sheets

(B) (A) TM 31 41a 1 33 45a 5 45b 32 42a 2 30 34

31 41a 26a 24a 14 15 25a 21b 1 41b 23b 22b 16 3 6a 43a 43b 25b 26c 24b 42a 42b 34 2 23a 13 11 21a 22a 12

(A)
TM
41b
6a
43b
42b
1
22b
3
22a
12
25a
21b
21a
15
25b
11
14
13
23b
24a
23a
24b
2
26a
16
26c
34
31
41a
43a
42a
(B)
31
41a
1
33
45b
2
34
5
42a
45a
32
30

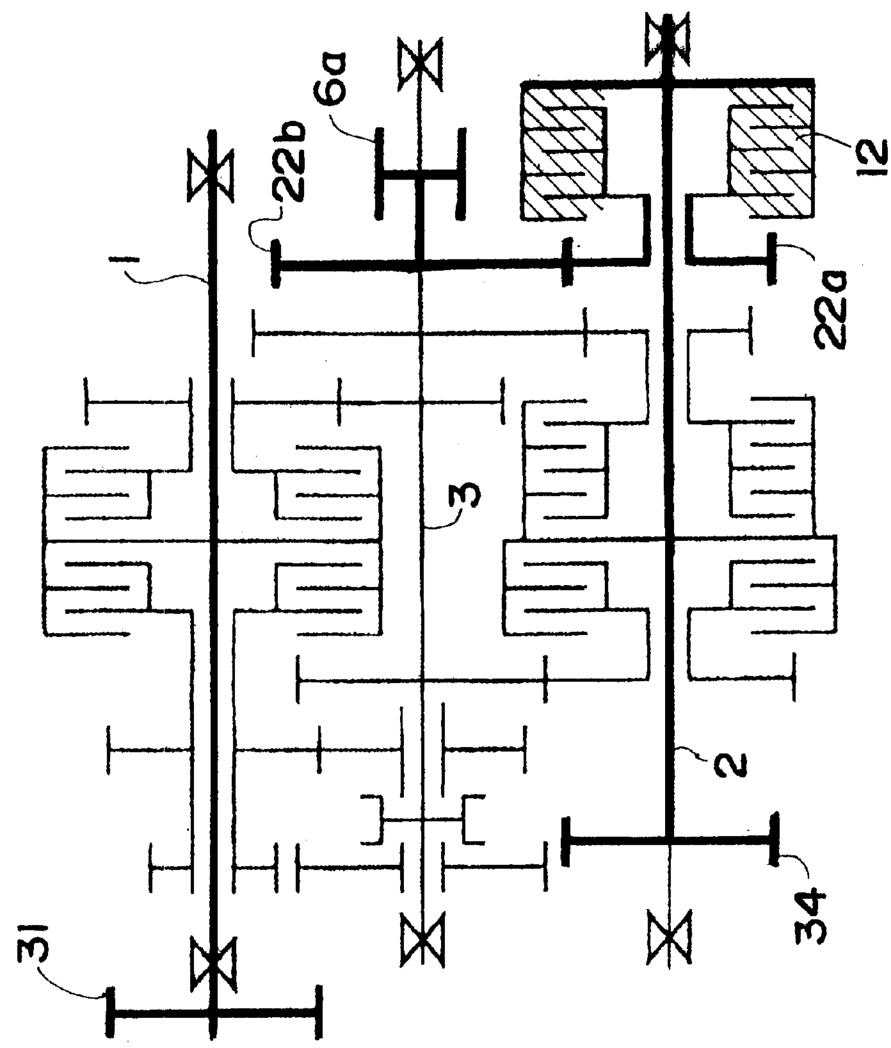
Fig. 6
(2ND)
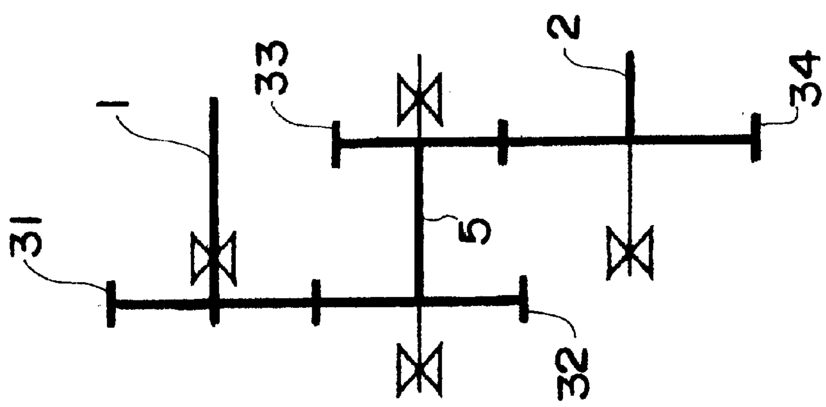

1
6a
3
13
23b
23a
2
16
34
31
(3RD)
33
5
32
30

(4TH)

15
25a
1
3
6a
25b
(5TH)

(REV)

PARALLEL SHAFT TRANSMISSION

FIELD OF THE INVENTION

The present invention relates to a parallel shaft transmission, in which a plurality of gear trains are provided to connect a plurality of shafts that are disposed parallel with one another, and a plurality of clutching means are provided each to be engaged selectively with a corresponding one of the gear trains to establish a power transmission path.

BACKGROUND OF THE INVENTION

Such parallel shaft transmissions are widely used in automobiles. For example, an automatic transmission with five speed ratios has been disclosed in Japanese Laid-Open Patent Publications No. 4 (1992)-331852 (A), No. 5 (1993)-272601 (A) and No. 7 (1995)-19295 (A).

In this transmission, a plurality of gear trains are arranged over a plurality of shafts which are disposed in parallel with one anther, and these gear trains are disposed axially parallel with one anther. In addition, a plurality of clutches are provided each close to a respective gear train for the purpose of selecting that specific gear train for mechanical power transmission. Because of this arrangement, generally, the axial dimension of the transmission is relatively large. This tendency of the transmission having a large axial dimension becomes more prominent as the number of available speed ratios is increased in the design of the transmission. Especially, automatic transmissions are prone to acquiring a large size because they typically include hydraulic clutches, whose dimensions in radial direction as well as in axial direction are relatively large.

Nowadays, transmissions which are used in automobiles are equipped with a large number of speed ratios to improve drive performance, and the number of speed ratios has increased from three to four. Now, a transmission with five speed ratios is coming to be practical, so the size of the transmission is becoming a serious problem because the transmission, which has such a large number of speed ratios, acquires a correspondingly large size. In the automatic transmission with five speed ratios which has been disclosed in the above mentioned publications, various ideas are applied in the arrangement of the gears and the clutches to minimize the size of the transmission.

SUMMARY OF THE INVENTION

It is an object of the present invention to provide a parallel shaft transmission which incorporates a large number of speed ratios in a construction designed as compact as possible by contriving an arrangement for integrating gears and clutches.

In order to achieve this objective, the present invention provides a parallel shaft transmission comprising a first input shaft, a second input shaft, and a counter shaft, which are disposed parallel with one another. This transmission further comprises at least one set of first speed ratio gear train (for example, the fifth speed gear train 25*a* and 25*b,* the fourth speed gear train 24*a* and 24*b* and the reverse gear train 26*a,* 26*b* and 26*c* of the following embodiment shown in FIG. 3), at least one first clutching means (for example, the fifth speed clutch 15 and the fourth speed clutch 14 of the embodiment shown in FIG. 3), at least one set of second speed ratio gear train (for example, the second speed gear train 22*a* and 22*b,* the LOW gear train 21*a* and 21*b* and the third speed gear train 23*a* and 23*b* of the embodiment shown in FIG. 3), at least one second clutching means (for example, the second speed clutch 12, the LOW clutch 11 and the third speed clutch 13 of the embodiment shown in FIG. 3), and a connection gear train. Each set of first speed ratio gear train includes a first speed ratio drive gear (for example, the fifth speed drive gear 25*a,* the fourth speed drive gear 24*a* and the reverse drive gear 26*a* of the embodiment shown in FIG. 3) which is disposed on the first input shaft and a first speed ratio driven gear (for example, the fifth speed driven gear 25*b,* the fourth speed driven gear 24*b* and the reverse driven gear 26*c* of the embodiment shown in FIG. 3) which is disposed on the counter shaft, with the first speed ratio drive gear and the first speed ratio driven gear meshing with each other. The first clutching means is disposed on the first input shaft, and it connects and disconnects the first speed ratio drive gear rotationally to and from the first input shaft, respectively. Each set of second speed ratio gear train includes a second speed ratio drive gear ( for example, the second speed drive gear 22*a,* LOW drive gear 21*a* and third speed drive gear 23*a* of the embodiment shown in FIG. 3) which is disposed on the second input shaft and a second speed ratio driven gear (for example, the second speed driven gear 22*b,* the LOW driven gear 21*b* and the third speed driven gear 23*b* of the embodiment shown in FIG. 3) which is disposed on the counter shaft, with the second speed ratio drive gear and the second speed ratio driven gear meshing with each other. The second clutching means is disposed on the second input shaft, and it connects and disconnects the second speed ratio drive gear rotationally to and from the second input shaft, respectively. The connection gear train is used for power transmission from the first input shaft to the second input shaft through a gear (for example, the second and third connection gears 32 and 33 of the embodiment shown in FIG. 3) on an idle shaft which is disposed parallel with the first input shaft.

In this parallel shaft transmission, the drive power which is input from the engine to the first input shaft can be transmitted through the connection gear train directly to the second input shaft. As the speed ratio gear trains are disposed between the first input shaft and the counter shaft as well as between the second input shaft and the counter shaft, the axial length of the transmission is relatively short, so the transmission is made compact. Also, because the connection gear train includes a gear which is disposed on an idle shaft, the distance between the first input shaft and the second input shaft is adjustable as desired. Therefore, the clutching means which comprise hydraulic clutches, whose dimensions in radial direction are relatively large, do not interfere with each other even though the first clutching means, which is disposed on the first input shaft, and the second clutching means, which is disposed on the second input shaft, are positioned substantially on a common plane which is perpendicular to the shafts. There is a high degree of freedom in the arrangement of the clutching means. As a result, the first and second speed ratio gear trains and the first and second clutching means are arranged appropriately to construct the transmission in a relatively small size.

It is preferable that the connection gear train comprise a first connection gear which is mounted on the first input shaft, a second connection gear and a third connection gear which are disposed on the idle shaft and a fourth connection gear which is mounted on the second input shaft. In this case, the first connection gear meshes with the second connection gear; the second connection gear and the third connection gear rotate together as a unified body; and the third connection gear meshes with the fourth connection gear. In this construction, only the second and third connection gears, which rotate together as a unified body, are provided on the idle shaft. Thus, bearings can be disposed adjacent to these gears to support the idle shaft so as to restrict deformation of the idle shaft, which deformation may otherwise occur during the power transmission under a heavy load. Therefore, the meshing of the connection gears which are supported by the idle shaft is not affected from changes in the load of the transmission. As a result, the noise of the meshing is controlled to a relatively low level. Furthermore, because the design is such that the first connection gear meshes with the second connection gear while the third connection gear meshes with the fourth connection gear, the tooth surfaces which are located on one side in each connection gear are used for the acceleration while those located on the other side are used for the deceleration. Therefore, the tooth surfaces can be modified independently for the acceleration and for the deceleration to reduce the meshing gear noise.

Preferably, one of the second clutching means (for example, the second speed clutch 12 of the embodiment shown in FIG. 3) and an output gear (for example, the last reduction drive gear 6*a* of the embodiment shown in FIG. 3) which is mounted on the counter shaft are positioned substantially on a plane which is perpendicular to the shafts. The output gear train is used as the last reduction gear train, so it has a comparatively large reduction ratio. Thus, the output gear (last reduction drive gear) has a small diameter. Generally, the space surrounding the output gear tends to become a dead space in transmission design. However, in this transmission, this space, which may be a dead space otherwise, is utilized for incorporating the second clutching means. Therefore, the second clutching means is disposed substantially in the same plane as the output gear, to make the transmission compact.

This transmission can be constructed as a five speed ratio transmission. In this case, preferably, the first speed ratio gear train comprises a fourth speed gear train and a fifth speed gear train; the first clutching means comprises a fourth speed clutch and a fifth speed clutch; the second speed ratio gear train comprises a LOW gear train, a second speed gear train and a third speed gear train; and the second clutching means comprises a LOW clutch, a second speed clutch and a third speed clutch. Furthermore, it is preferable to provide a reverse gear train including a reverse drive gear, which is disposed on the first input shaft, and a reverse driven gear, which is disposed on the counter shaft. In this case, the reverse drive gear is rotationally connected with the reverse driven gear through a reverse idler gear, which rotates around a shaft that is provided parallel with the first input shaft. In addition, the reverse drive gear and the fourth speed drive gear, which is a component of the fourth speed gear train, are couple with each other as one body and are disposed rotatably on the first input shaft, such that the reverse drive gear and the fourth speed drive gear are connected and disconnected rotationally to and from the first input shaft by the fourth speed clutch, respectively. On the other hand, the fourth speed driven gear, which is the other component of the fourth speed ratio gear train, and the reverse driven gear are each disposed rotatably on the counter shaft, and a dog clutch is provided on the counter shaft, such that the fourth speed driven gear and the reverse driven gear are selectively connected and disconnected to and from the counter shaft, respectively.

In this way, a compact five speed transmission capable of establishing five forward speed ratios and one reverse speed ratio is realized according to the present invention. Especially in the above mentioned arrangement, at first, either the fourth speed driven gear or the reverse driven gear is connected rotationally to the counter shaft by the dog clutch to establish the forward drive range (D range) or the reverse drive range (R range), respectively, and then the fourth speed clutch is engaged to establish the fourth speed ratio or the reverse speed ratio, correspondingly. Here, the fourth speed clutch is used both for establishing the four speed ratio and for establishing the reverse speed ratio. There is another advantage in this arrangement. If the fifth speed gear train is removed to construct a four speed transmission, then the fourth speed clutch, as it is, is still usable for establishing the four speed ratio and the reverse speed ratio.

A second embodiment of parallel shaft transmission according to the present invention comprises a first input shaft, a second input shaft, a first counter shaft and a second counter shaft, which are disposed parallel with one another. This transmission further comprises at least one set of first speed ratio gear train (for example, the fourth speed gear train 74*a* and 74*b*, the fifth speed gear train 75*a* and 75*b* and the reverse gear train 76*a* and 76*c* of the embodiment shown in FIG. 11), at least one first clutching means (for example, the fourth speed clutch 64 and the fifth speed clutch 65 of the embodiment shown in FIG. 11), at least one set of second speed ratio gear train (for example, the third speed gear train 73*a* and 73*b*, the LOW gear train 71*a* and 71*b* and the second speed gear train 72*a* and 72*b* of the embodiment shown in FIG. 11), at least one second clutching means (for example, the third speed clutch 63, the LOW clutch 61 and the second speed clutch 62 of the embodiment shown in FIG. 11) and a connection gear train (for example, the connection gear train 80 of the embodiment shown in FIG. 11). In this case, each set of first speed ratio gear train includes a first speed ratio drive gear (for example, the fourth speed drive gear 74*a*, the fifth speed drive gear 75*a* and the reverse drive gear 76*a* of the embodiment shown in FIG. 11) which is disposed on the first input shaft and a first speed ratio driven gear ( for example, the fourth speed driven gear 74*b*, the fifth speed driven gear 75*b* and the reverse driven gear 76*c* of the embodiment shown in FIG. 11) which is disposed on the first counter shaft, with the first speed ratio drive gear and the first speed ratio driven gear meshing with each other. The first clutching means is disposed on the first input shaft, such that it connects and disconnects the first speed ratio drive gear rotationally to and from the first input shaft, respectively. Each set of second speed ratio gear train includes a second speed ratio drive gear (for example, the third speed drive gear 73*a*, the LOW drive gear 71*a* and the second drive gear 72*a* of the embodiment shown in FIG. 11) which is disposed on the second input shaft and a second speed ratio driven gear (for example, the third speed driven gear 73*b*, the LOW driven gear 71*b* and the second speed driven gear 72*b* of the embodiment shown in FIG. 11) which is disposed on the second counter shaft, with the second speed ratio drive gear and the second speed ratio driven gear meshing with each other. The second clutching means is disposed on the second input shaft, such that it connects and disconnects the second speed ratio drive gear rotationally to and from the second input shaft, respectively. The connection gear train is used for power transmission from the first input shaft to the second input shaft through a connection idle gear (for example, the second connection gear 82 of the embodiment shown in FIG. 11), which is provided rotatably on the first counter shaft. In this construction, transmission output is taken out from first and second output gears (for example, the first and second last reduction drive gears 56*a* and 56*b* of the embodiment shown in FIG. 11), which are mounted on the first and second counter shafts, respectively.

In this parallel shaft transmission, the drive power which is input from the engine to the first input shaft can be transmitted through the connection gear train directly to the second input shaft. As the speed ratio gear trains are disposed between the first input shaft and the first counter shaft as well as the second input shaft and the second counter shaft, the axial length of the transmission is relatively short, so the transmission is made relatively compact. Also, because the distance between the first input shaft and the second input shaft can be determined as desired, the clutching means do not interfere with each other even though the first clutching means, which is disposed on the first input shaft, and second clutching means, which is disposed on the second input shaft, are positioned substantially on a common plane which is perpendicular to the shafts. As a result, the first and second speed ratio gear trains and the first and second clutching means are arranged appropriately to construct the transmission in a relatively small size.

As mentioned previously, the first and second output gears (last reduction drive gears) have small diameters. Generally, the space surrounding these output gears tends to become a dead space in transmission design. However, according to the present invention, this space of the transmission, which may be a dead space otherwise, is utilized for incorporating the second clutching means. In other words, one of the second clutching means and the first and second output gears are positioned substantially on a common plane which is perpendicular to the shafts to make the transmission compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 6 is a skeleton diagram showing the power transmission path which provides the second speed ratio of the transmission.

DESCRIPTION OF THE PREFERRED EMBODIMENTS

Now, preferred embodiments according to the present invention will be described in reference to the drawings. FIGS. 1 through 4 show a first embodiment of parallel shaft transmission according to the present invention. In a transmission housing HSG, this transmission comprises a torque converter TC, which is connected to the output shaft of an engine (not shown), a parallel shaft speed change mechanism TM, which is connected to the output member (or turbine) of the torque converter, and a differential mechanism DF including a last reduction driven gear 6*b*, which meshes with the last reduction drive gear 6*a* of the speed change mechanism TM. The drive power of the vehicle is transmitted through the differential mechanism DF to lateral wheels.

Figure 4:
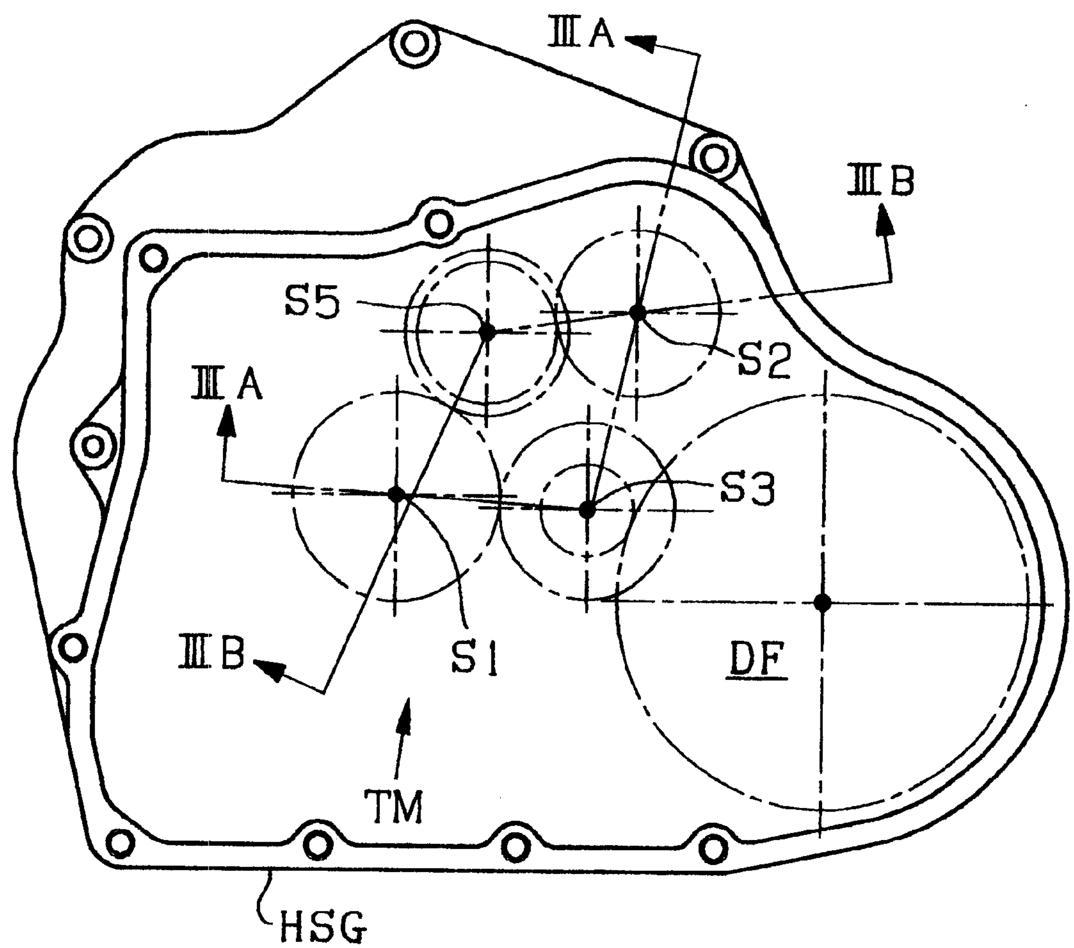
FIG. 4 is a general, sectional side view of the transmission.
Figure 5:
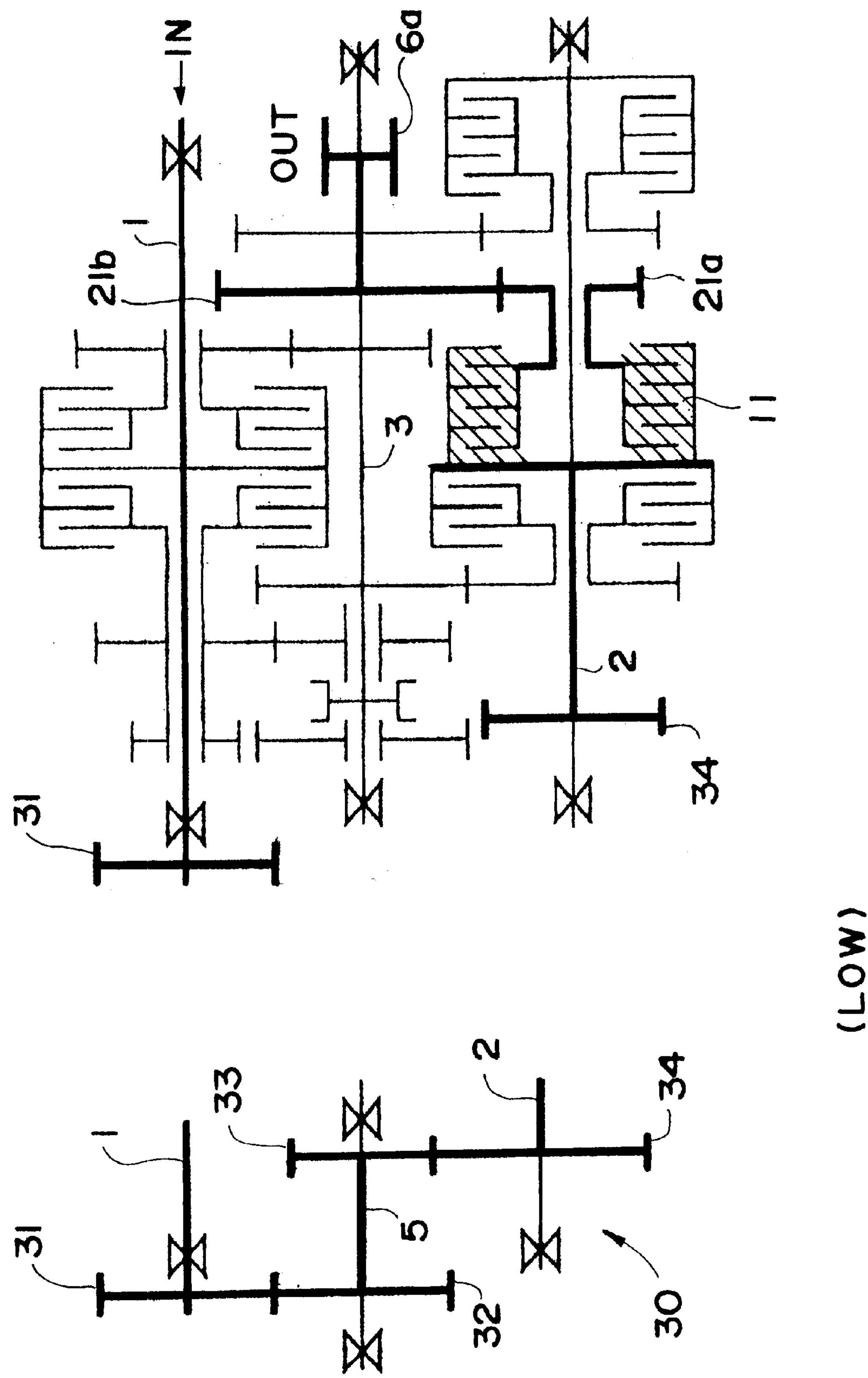
FIG. 5 is a skeleton diagram showing the power transmission path which provides the first speed ratio or LOW ratio of the transmission.
Figure 7:
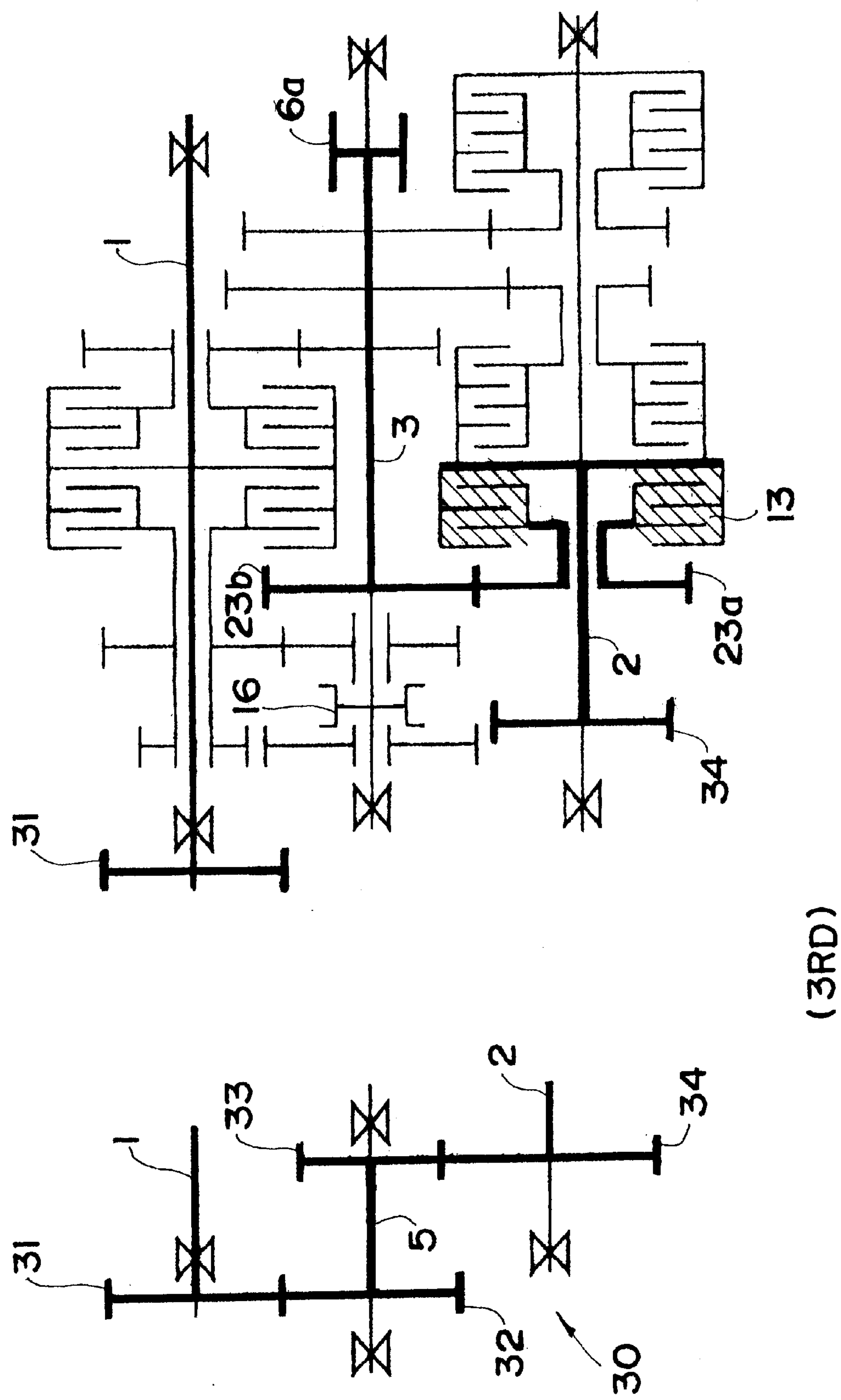
FIG. 7 is a skeleton diagram showing the power transmission path which provides the third speed ratio of the transmission.
Figure 8:
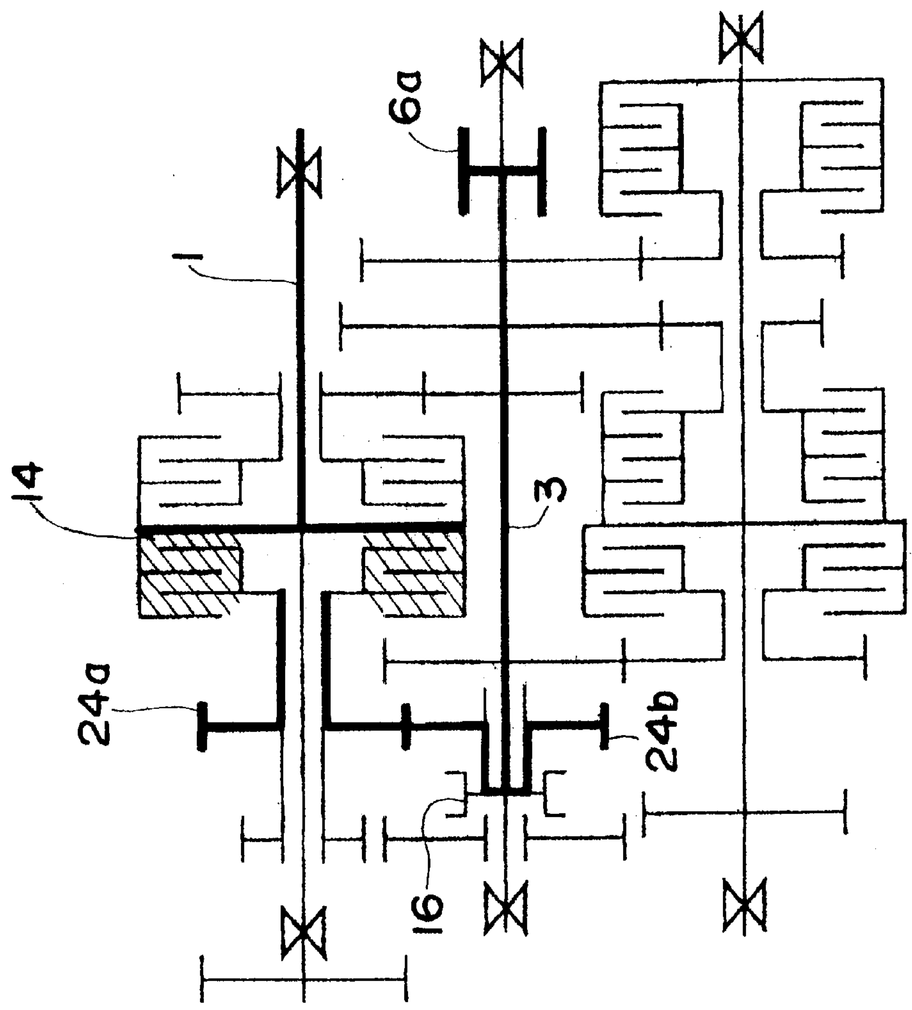
FIG. 8 is a skeleton diagram showing the power transmission path which provides the fourth speed ratio of the transmission.
Figure 8:
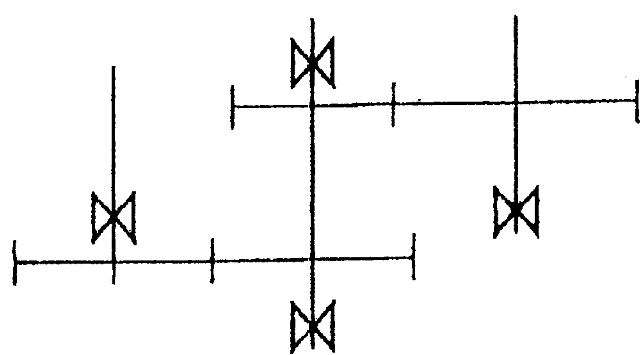
Figure 9:
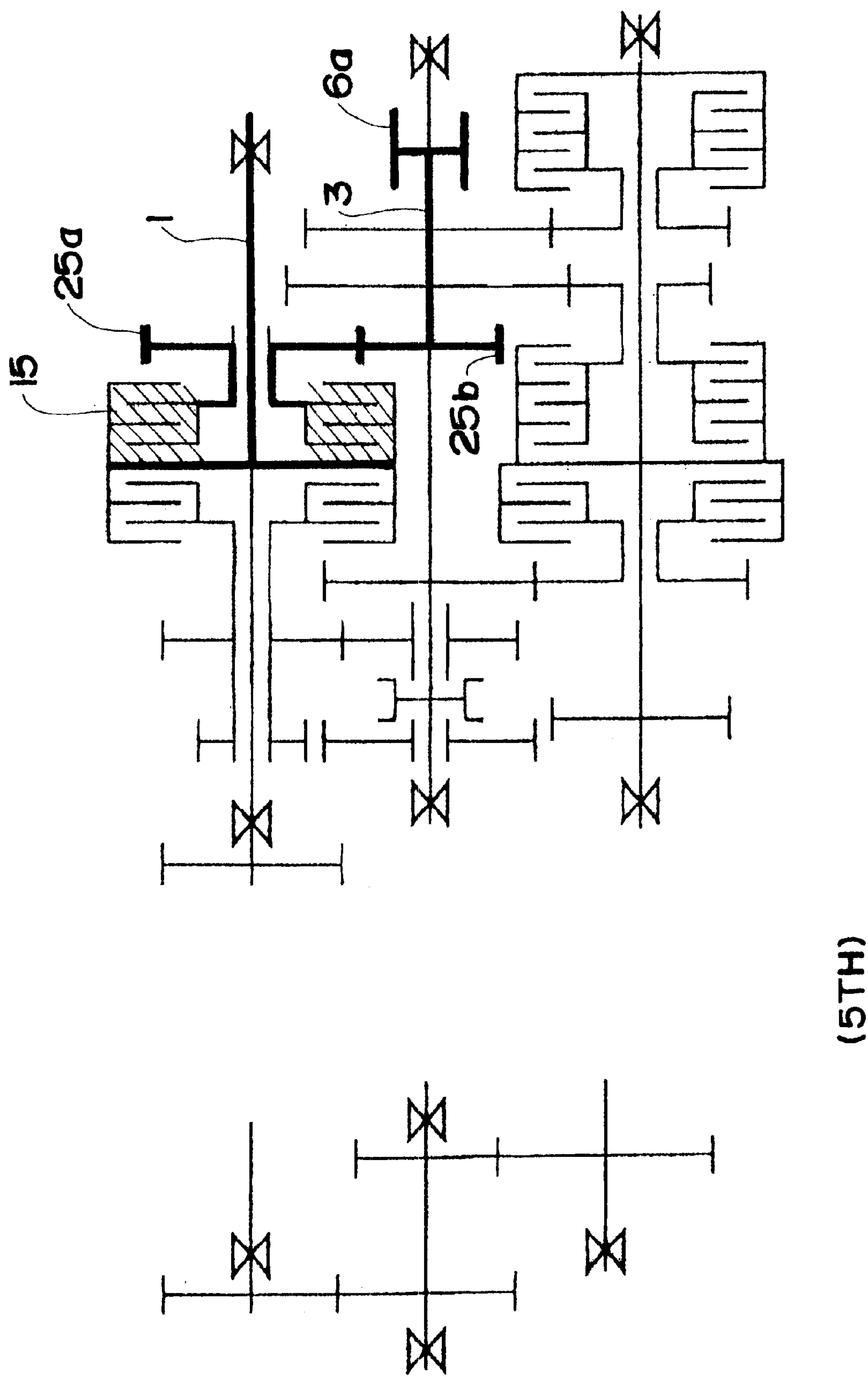
FIG. 9 is a skeleton diagram showing the power transmission path which provides the fifth speed ratio of the transmission.
Figure 10:
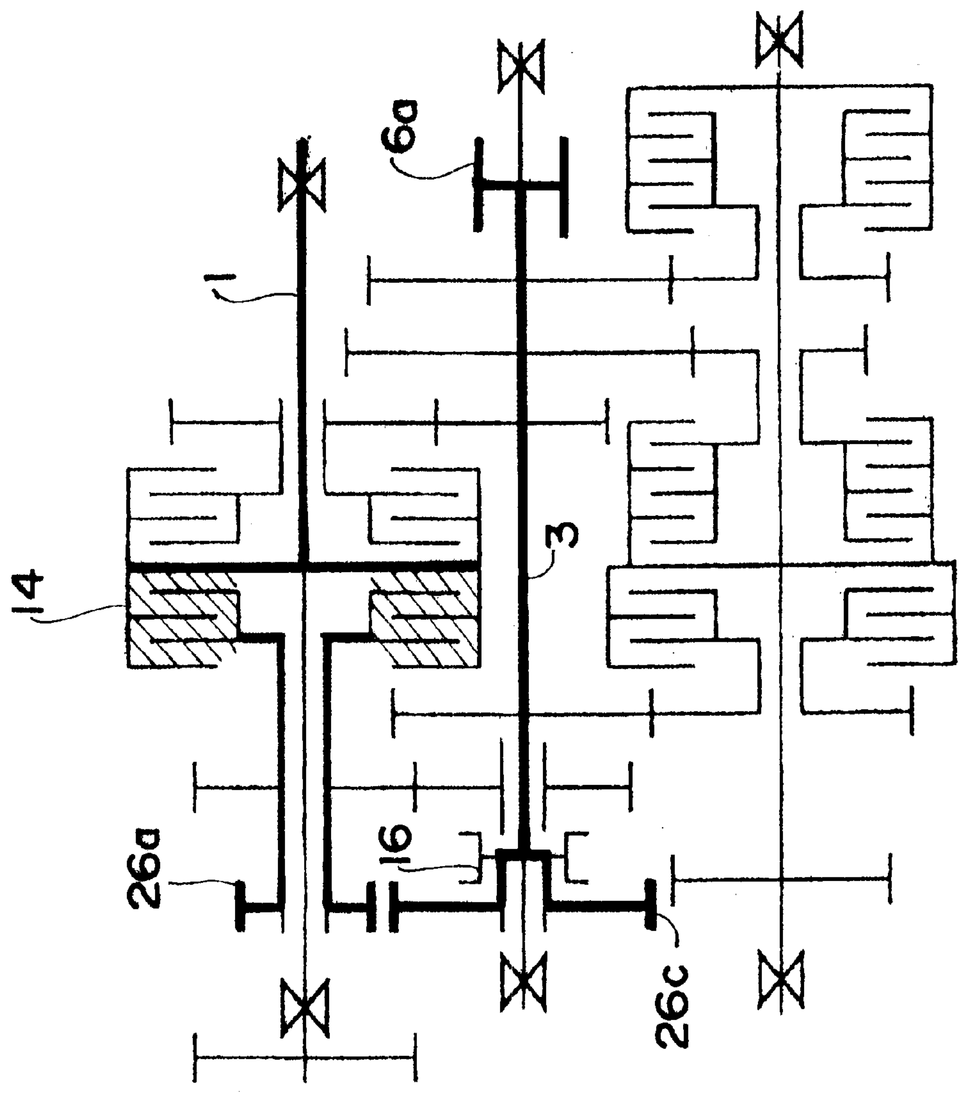
FIG. 10 is a skeleton diagram showing the power transmission path which provides the reverse range of the transmission.
Figure 10:
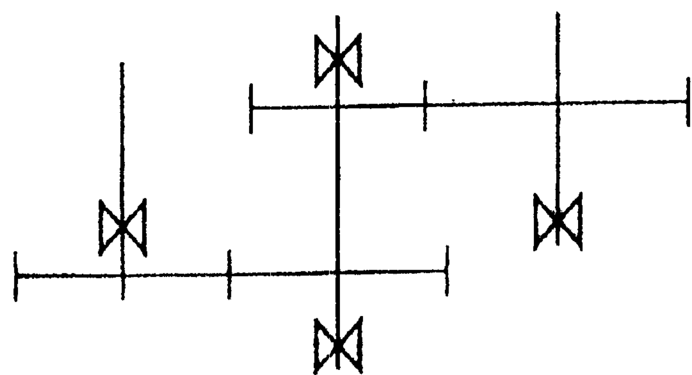

The speed change mechanism TM includes a first input shaft 1, a second input shaft 2, a counter shaft 3, and an idle shaft 5, all of which are disposed parallel with one another. FIG. 4 shows the relative positions of the centers of these shafts, each center being indicated by a corresponding alphanumeric mark, S1, S2, S3 or S5. FIGS. 3A and 3B show the rotational components of the speed change mechanism TM, which are arranged for mechanical power transmission. FIG. 3A is a sectional view showing the first input shaft 1 (S1), the second input shaft 2 ( S2 ) and the counter shaft 3 (S3), which are taken along line IIIA—IIIA in FIG. 4, while FIG. 3B is a sectional view showing the first input shaft 1 (S1), the second input shaft 2 (S2) and the idle shaft 5 (S5), which are taken along line IIIB—IIIB in FIG. 4. Also, FIG. 1 corresponds with FIG. 3A while FIG. 2 corresponds with FIG. 3B, all of which are sectional views of the speed change mechanism TM.

The first input shaft 1 is connected directly to the turbine of the torque converter TC and is supported rotatably by bearings 41*a* and 41*b*. The first input shaft 1 receives the drive power from the turbine and rotates with it at the same rotational speed. On this input shaft 1, from the side of the torque converter TC (i.e., the right side of the drawing), disposed are a fifth speed drive gear 25*a*, a fifth speed clutch 15, a fourth speed clutch 14, a fourth speed drive gear 24*a*, a reverse drive gear 26*a*, and a first connection gear 31. The fifth speed drive gear 25*a* is disposed rotatably on the first input shaft 1, and the fifth speed clutch 15, which is actuated hydraulically, engages with the fifth speed drive gear 25*a* to connect it rotationally to the first input shaft 1. The fourth speed drive gear 24*a* and the reverse drive gear 26*a*, which are formed in one body, are disposed rotatably on the first input shaft 1, and the fourth speed clutch 14, which is actuated hydraulically, engages with these gears to connect them rotationally to the first input shaft 1. The first connection gear 31 is mounted on the first input shaft 1, at the left end thereof outside the bearing 41a, which supports the first input shaft 1 rotatably. In this condition, the first connection gear 31 and this end portion of the first input shaft 1 are supported only by this bearing 41*a* in cantilever.

The second input shaft 2 is also supported rotatably by bearings 42*a* and 42*b*. On this input shaft 2, from the right side of the drawing, disposed are a second speed clutch 12, a second speed drive gear 22*a*, a LOW drive gear 21*a*, a LOW clutch 11, a third speed clutch 13, a third speed drive gear 23*a*, and a fourth connection gear 34. The second speed drive gear 22*a*, the LOW drive gear 21*a* and the third speed drive gear 23*a* are each disposed rotatably on the second input shaft 2, and the second speed clutch 12, the LOW clutch 11, or the third speed clutch 13, which is actuated hydraulically, engages with the respective gear to connect it rotationally to the second input shaft 2. In addition, the fourth connection gear 34 is coupled to the second input shaft 2.

The idle shaft 5 including a second connection gear 32 and a third connection gear 33, which are formed as one body with the idle shaft 5, is supported rotatably by bearings 45*a* and 45*b*. The second connection gear 32 meshes with the first connection gear 31 while the third connection gear 33 meshes with the fourth connection gear 34. The first, second, third and fourth connection gears constitute a connection gear train 30, through which the rotation of the first input shaft 1 is transmitted continually to the second input shaft 2.

The counter shaft 3 is supported rotatably by bearings 43*a* and 43*b*. On this shaft 3, from the right side of the drawing, disposed are the above mentioned last reduction drive gear 6*a*, a second speed driven gear 22*b*, a LOW driven gear 21*b*, a fifth speed driven gear 25*b*, a third speed driven gear 23*b*, a fourth speed driven gear 24*b*, a dog clutch 16, and a reverse driven gear 26*c*. The last reduction drive gear 6*a*, the second speed driven gear 22*b*, the LOW driven gear 21*b*, the fifth speed driven gear 25*b* and the third speed driven gear 23*b* are fixed on and rotate together with the counter shaft 3 while the fourth speed driven gear 24*b* and the reverse driven gear 26*c* are each disposed rotatably on the counter shaft 3. The dog clutch 16 is actuated axially in one direction to engage with the fourth speed driven gear 24*b* so as to connect it rotationally to the counter shaft 3 or in the opposite direction to engage with the reverse driven gear 26*c* so as to connect it rotationally to the counter shaft 3.

As shown in the drawings, the LOW drive gear 21*a* meshes with the LOW driven gear 21*b*; the second speed drive gear 22*a* meshes with the second speed driven gear 22*b*; the third speed drive gear 23*a* meshes with the third speed driven gear 23*b*; the fourth speed drive gear 24*a* meshes with the fourth speed driven gear 24*b*; and the fifth speed drive gear 25*a* meshes with the fifth speed driven gear 25*b*. In addition, the reverse drive gear 26*a* meshes with a reverse idler gear 26*b* (refer to FIG. 2), which then meshes with the reverse driven gear 26*c*.

Figure 1:
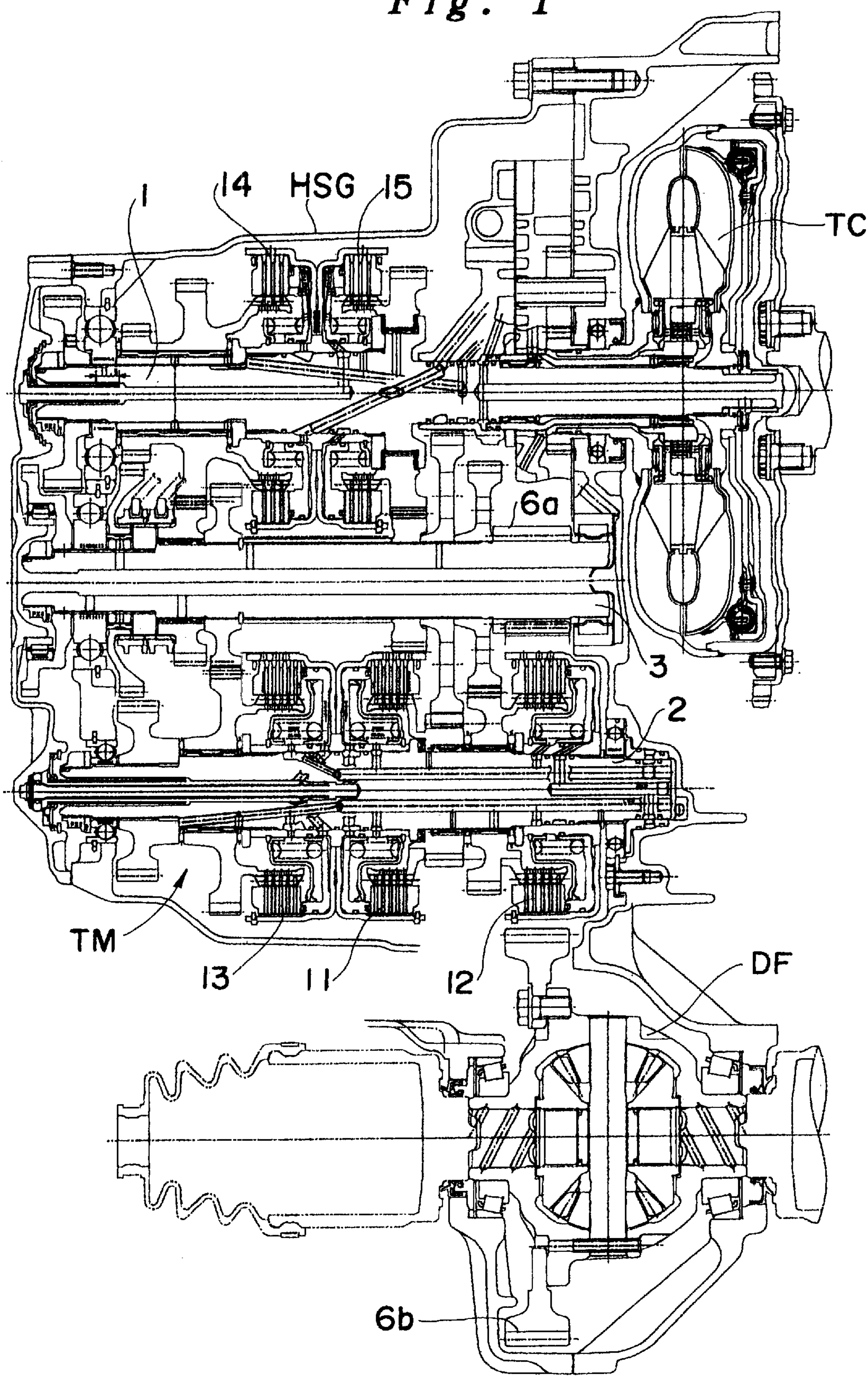
FIG. 1 is a sectional view of a first embodiment of transmission according to the present invention.
Figure 2:
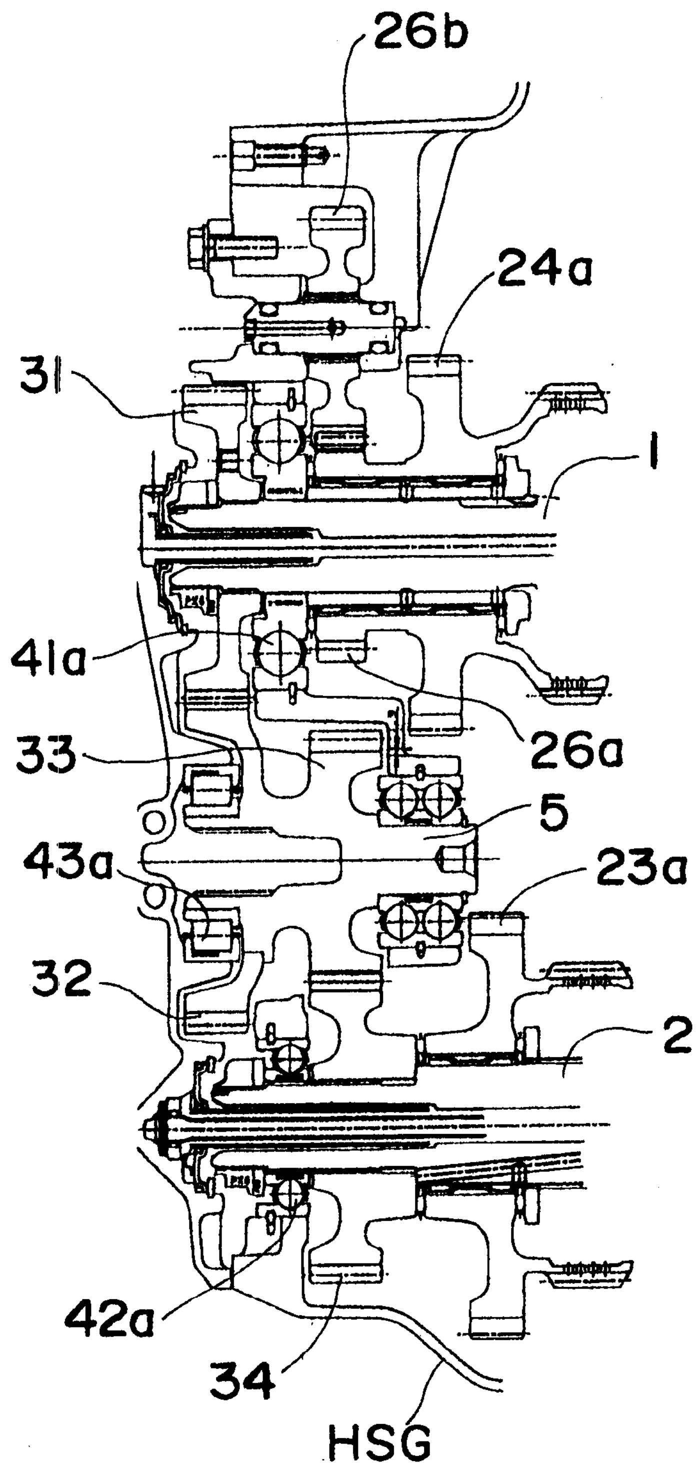
FIG. 2 is a partial sectional view of the transmission.
Figure 3:
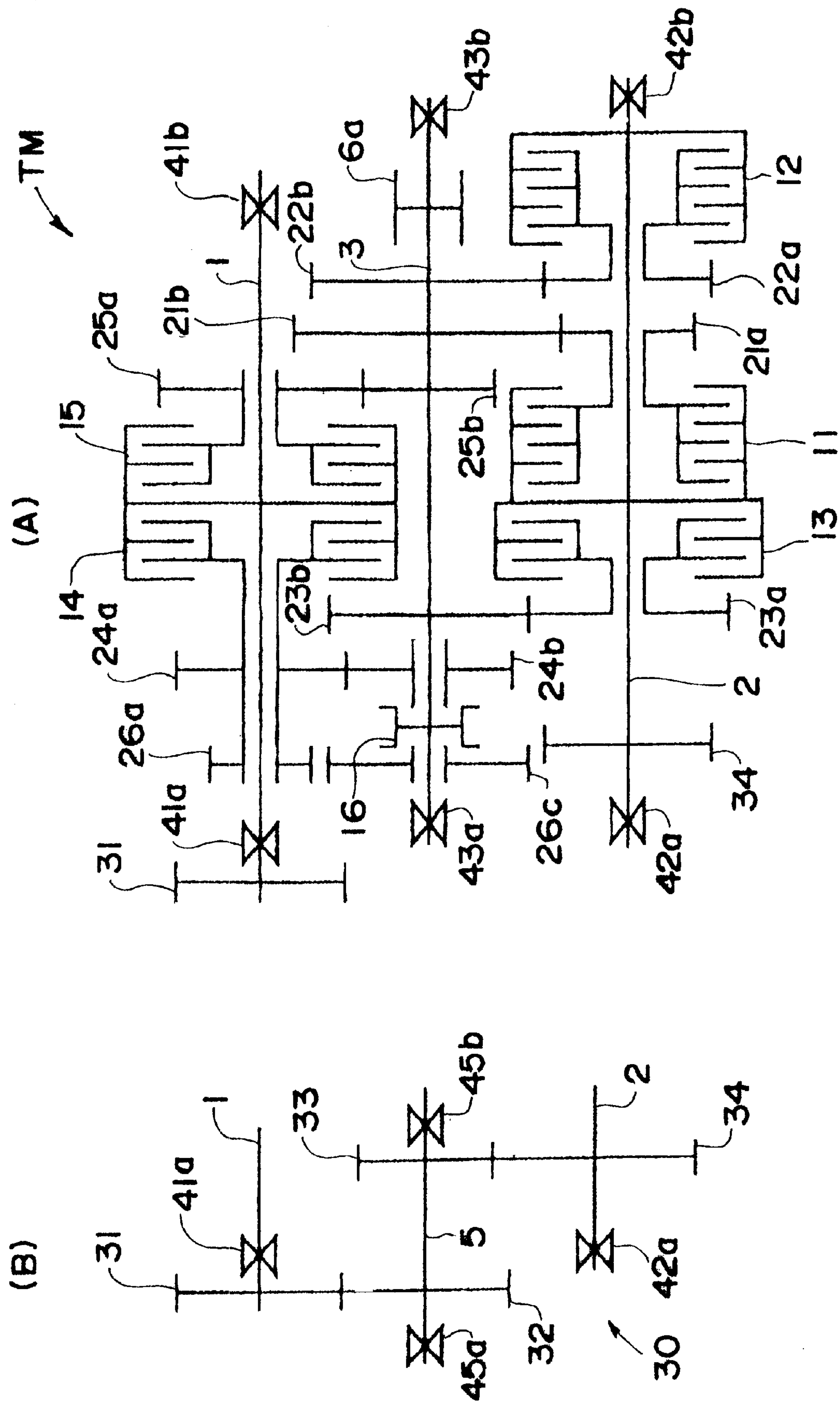
FIG. 3 is a skeleton diagram showing the power transmission path arrangement of the transmission.

The last reduction drive gear 6*a* meshes with the last reduction driven gear 6*b* (refer to FIG. 1, which shows that they are situated at the same position in axial direction though the drawing does not show the actual condition that they mesh with each other). The rotation of the counter shaft 3 is transmitted through the last reduction drive and driven gears 6*a* and 6*b* to the differential mechanism DF.

Now, how each speed ratio is established and through which path the drive power is transmitted at each speed ratio are described in reference to FIG. 5 through FIG. 10. This transmission is capable of establishing the first speed ratio or LOW ratio, the second speed ratio, the third speed ratio, the fourth speed ratio and the fifth speed ratio for the forward drive ratio range (D range) while the dog clutch 16 is shifted toward the right side of the drawing, where the dog clutch 16 engages with the fourth speed driven gear 24*b* to connect it rotationally to the counter shaft 3. For the reverse drive, the dog clutch 16 is shifted leftward, where the dog clutch 16 engages with the reverse driven gear 26*c* to connect it rotationally to the counter shaft 3.

First, the establishment of each speed ratio of the forward drive range is described. The LOW ratio is established when the LOW clutch 11 is engaged. The power transmission path for this speed ratio is indicated by a bold line in FIG. 5. The rotational drive power which is input from the torque converter TC to the first input shaft 1 is transmitted through the connection gear train 30 to the second input shaft 2. Because the LOW clutch 11 is engaged, the LOW drive gear 21*a* which is driven at the same rotational speed as the second input shaft 2 drives the LOW driven gear 21*b* mounted on the counter shaft 3. This drive power is then transmitted through the last reduction drive and driven gears 6*a* and 6*b* to the differential mechanism DF.

The second speed ratio is established when the second speed clutch 12 is engaged. The power transmission path for this speed ratio is indicated by a bold line in FIG. 6. The rotational drive power which is input from the torque converter TC to the first input shaft 1 is transmitted through the connection gear train 30 to the second input shaft 2. Because the second speed clutch 12 is engaged, the second speed drive gear 22*a* which is driven at the same rotational speed as the second input shaft 2 drives the second speed driven gear 22*b* mounted on the counter shaft 3. This drive power is then transmitted through the last reduction drive and driven gears 6*a* and 6*b* to the differential mechanism DF.

The third speed ratio is established when the third speed clutch 13 is engaged. The power transmission path for this speed ratio is indicated by a bold line in FIG. 7. The rotational drive power which is input from the torque converter TC to the first input shaft 1 is transmitted through the connection gear train 30 to the second input shaft 2. Because the third speed clutch 13 is engaged, the third speed drive gear 23*a* which is driven at the same rotational speed as the second input shaft 2 drives the third speed driven gear 23*b* mounted on the counter shaft 3. This drive power is then transmitted through the last reduction drive and driven gears 6*a* and 6*b* to the differential mechanism DF.

The fourth speed ratio is established when the fourth speed clutch 14 is engaged. The power transmission path for this speed ratio is indicated by a bold line in FIG. 8. The rotational drive power which is input from the torque converter TC to the first input shaft 1 is transmitted through the fourth speed clutch 14 to the fourth speed drive gear 24*a*, which drives the fourth speed driven gear 24*b*. Because the dog clutch 16 is kept engaged with the fourth speed driven gear 24*b* for the forward drive ratio range, the counter shaft 3 is driven. This drive power is then transmitted through the last reduction drive and driven gears 6*a* and 6*b* to the differential mechanism DF.

The fifth speed ratio is established when the fifth speed clutch 15 is engaged. The power transmission path for this speed ratio is indicated by a bold line in FIG. 9. The rotational drive power which is input from the torque converter TC to the first input shaft 1 is transmitted through the fifth speed clutch 15 to the fifth speed drive gear 25*a*, which drives the fifth speed driven gear 25*b*. The fifth speed driven gear 25*b*, which is fixed to the counter shaft 3, in turn, drives the counter shaft 3. This drive power is then transmitted through the last reduction drive and driven gears 6*a* and 6*b* to the differential mechanism DF.

Now, the establishment of the rearward drive range is described. The reverse drive ratio is established when the fourth speed clutch 14 is engaged, and the dog clutch 16 is shifted leftward. The power transmission path for this speed ratio is indicated by a bold line in FIG. 10. The rotational drive power which is input from the torque converter TC to the first input shaft 1 is transmitted through the fourth speed clutch 14 to the reverse drive gear 26*a,* which, in turn, drives the reverse driven gear 26*c* through the reverse idler gear 26*b*. Because the dog clutch 16 is engaged with the reverse driven gear 26*c* for the rearward drive ratio, the counter shaft 3 is driven. This drive power is then transmitted through the last reduction drive and driven gears 6*a* and 6*b* to the differential mechanism DF. It should be noted that, as described in this paragraph, the fourth speed clutch 14 is used as a reverse clutch for the establishment of the reverse drive range in this transmission in addition to the establishment of the above described fourth speed ratio.

In this parallel shaft transmission, the rotational drive power which is input from the engine through the torque converter TC to the first input shaft 1 is transmitted simultaneously through the connection gear train 30 to the second input shaft 2. For the output of the drive power, the fifth speed drive and driven gears 25*a* and 25*b,* the fifth speed clutch 15, the fourth speed drive and driven gears 24*a* and 24*b,* the reverse gear train 26*a,* 26*b* and 26*c* and the fourth speed clutch 14 (used also as a reverse clutch ) are disposed between the first input shaft 1 and the counter shaft 3 while the second speed drive and driven gears 22*a* and 22*b,* the second speed clutch 12, the LOW drive and driven gears 21*a* and 21*b,* the LOW clutch 11, the third speed drive and driven gears 23*a* and 23*b* and the third speed clutch 13 are disposed between the second input shaft 2 and the counter shaft 3. With this arrangement of the rotational components, the axial length of the transmission is relatively short, so the transmission is made compact.

Furthermore, in this transmission, the connection gear train 30 is positioned at one end of the transmission ( at the left end in the drawing), which is another factor contributing to the compactness of the transmission. In addition, the second speed clutch 12 is positioned substantially in the same plane which is perpendicular to the shafts as the last reduction drive gear 6*a,* which has a relatively small diameter. In this way, the space around the last reduction drive gear 6*a* in radial direction is utilized for incorporating the second speed clutch 12 to minimize the radial size of the transmission for compactness. Furthermore, the use of the dog clutch 16 enables the fourth speed clutch 14 to be used both for establishing the fourth speed ratio and for establishing the reverse speed ratio. As a result, this transmission incorporates a relatively small number of hydraulic clutches, which is another factor contributing to the compactness of the transmission.

Figure 13:
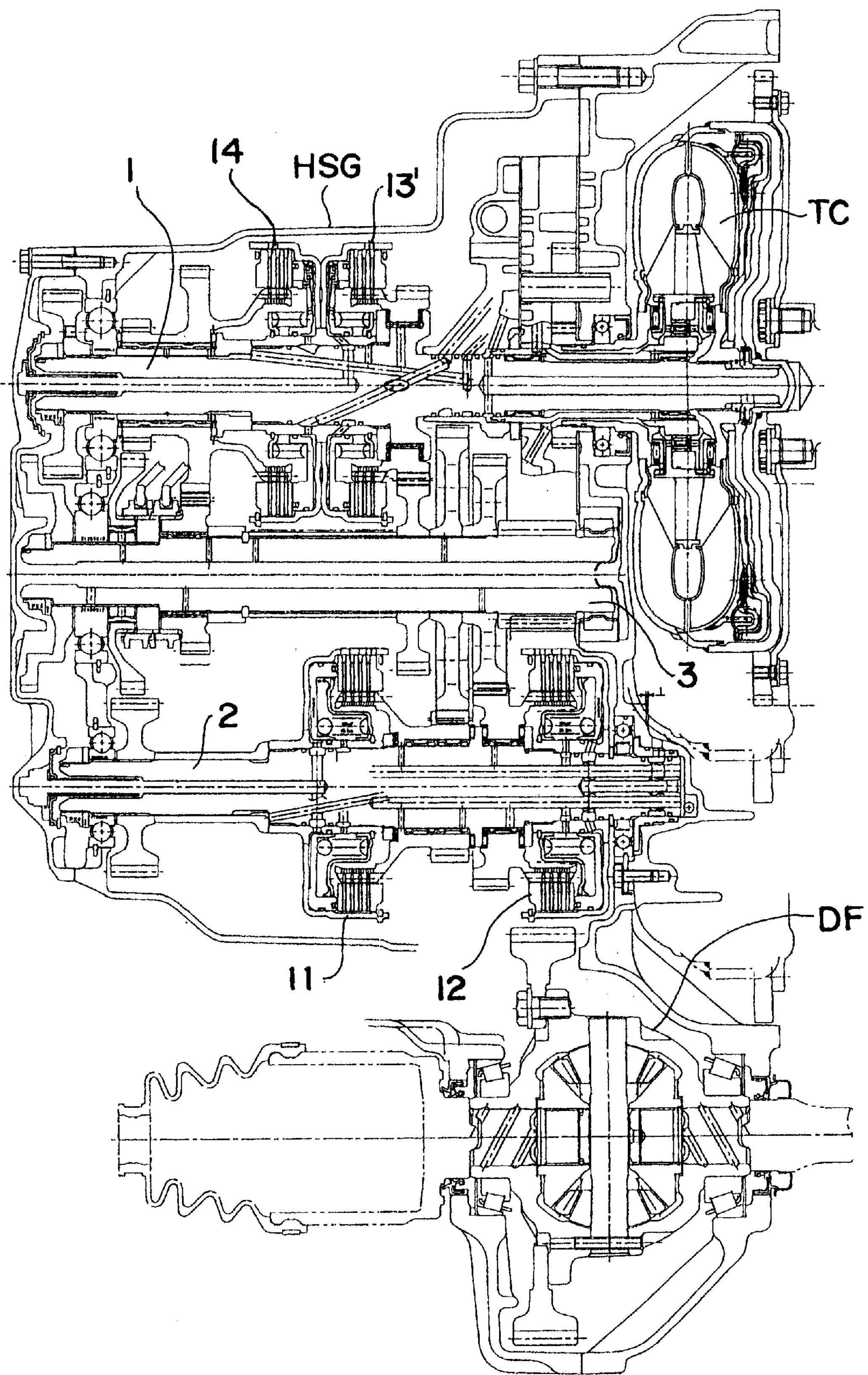
FIG. 13 is a sectional view of a transmission with four speed ratios, which is a modification of the first embodiment.

The present invention offers another advantage. In this transmission, if the fifth speed drive and driven gears 25*a* and 25*b* and the fifth speed clutch 15 are removed, then the parts remaining in the transmission without any change can form a transmission with four speed ratios. In this case, only the oil passage leading to the fifth speed clutch is removed in the hydraulic circuit connecting clutch actuation control valves. Thus, most of the parts of this five speed ratio transmission can be used also for constructing such four speed ratio transmission. FIG. 13 shows an example of such four speed transmission. This transmission is constructed by removing the third speed clutch 13 and the third speed drive and driven gears 23*a* and 23*b* which are incorporated in the five speed ratio transmission described above and shown in FIG. 1 and by replacing the fifth speed clutch 15 and the fifth speed drive and driven gears 25*a* and 25*b* of the above five speed ratio transmission with another third speed clutch 13' and another gear train for the third speed ratio.

Figure 11:
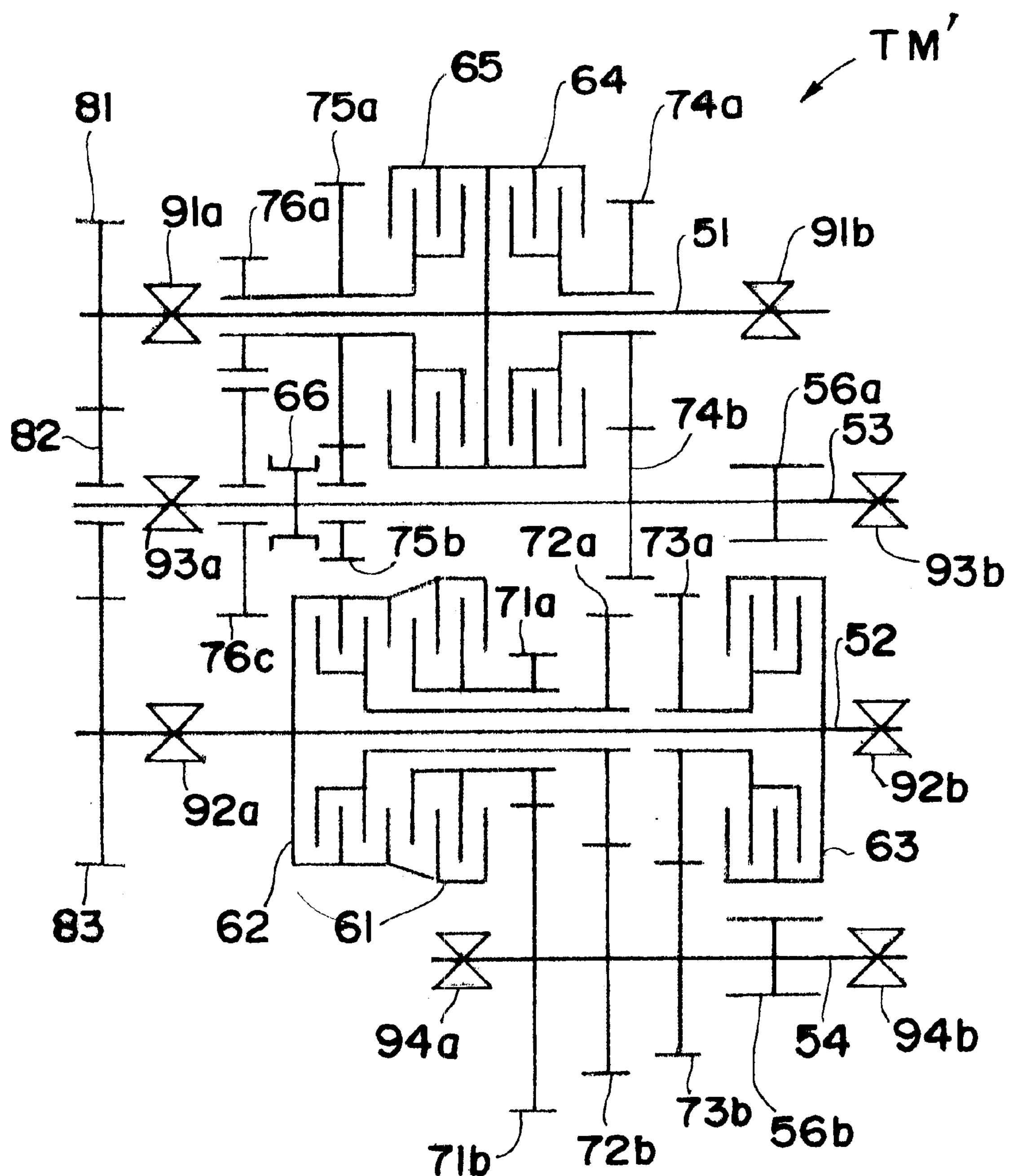
FIG. 11 is a skeleton diagram showing the power transmission path arrangement of a second embodiment of transmission according to the present invention.
Figure 12:
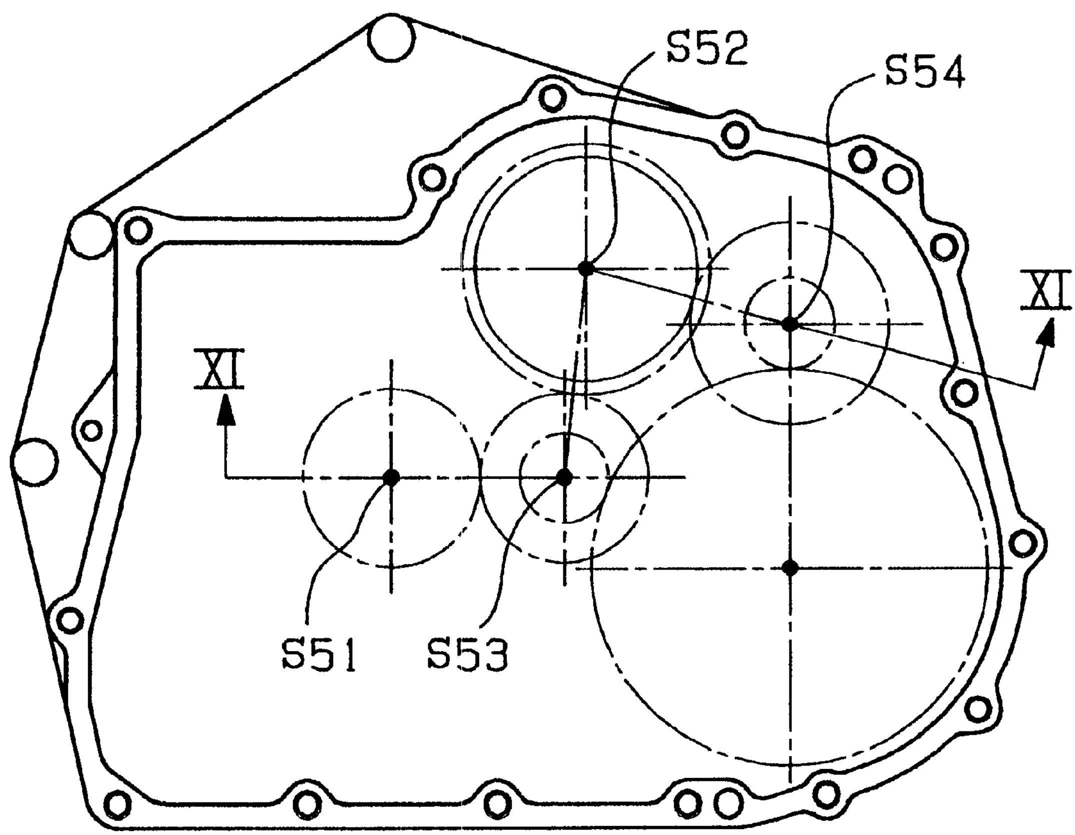
FIG. 12 is a general, sectional side view of the second transmission.

Now, a second embodiment of parallel shaft transmission according to the present invention will be described in reference to FIGS. 11 and 12. Correspondingly to the transmission shown in FIGS. 1 through 4, in a transmission housing, this transmission comprises a torque converter, which is connected to the output shaft of an engine, a parallel shaft speed change mechanism TM', which is connected to the output member (or turbine) of the torque converter TC, and a differential mechanism including a last reduction driven gear, which meshes with the last reduction drive gears of the speed change mechanism TM'. For the description of the power transmission paths, FIGS. 11 and 12 show specifically the speed change mechanism TM'.

The parallel shaft speed change mechanism TM' includes a first input shaft 51, a second input shaft 52, a first counter shaft 53, and a second counter shaft 54, all of which are disposed parallel with one another. FIG. 12 shows the relative positions of the centers of these shafts, each center being indicated by a corresponding alphanumeric mark, S51, S52, S53 or S54. FIG. 11 is a sectional view showing the rotational components of the speed change mechanism TM', which are arranged for mechanical power transmission, in the order of the first input shaft 51 (S51), the first counter shaft 53 (S53), the second input shaft 52 (S52) and the second counter shaft 54 (S54), which are taken along line XI—XI in FIG. 12.

The first input shaft 51 is connected directly to the turbine of the torque converter TC and is supported rotatably by bearings 91*a* and 91*b,* so the first input shaft 51 receives the drive power from and rotates together with the turbine. On this input shaft 51, from the side of the torque converter TC (i.e., the right side of the drawing), disposed are a fourth speed drive gear 74*a,* a fourth speed clutch 64, a fifth speed clutch 65, a fifth speed drive gear 75*a,* a reverse drive gear 76*a,* and a first connection gear 81. The fourth speed drive gear 74*a* is disposed rotatably on the first input shaft 51, and the fourth speed clutch 64, which is actuated hydraulically, engages with the fourth speed drive gear 74*a* to connect it rotationally to the first input shaft 51. The fifth speed drive gear 75*a* and the reverse drive gear 76*a,* which are formed in one body, are disposed rotatably on the first input shaft 51, and the fifth speed clutch 65, which is actuated hydraulically, engages with these gears to connect them rotationally to the first input shaft 51. The first connection gear 81 is mounted on the first input shaft 51, at the left end thereof outside the bearing 91*a,* which supports the first input shaft 51 rotatably. In this condition, the first connection gear 81 and this end portion of the first input shaft 51 are supported only by this bearing 91*a* in cantilever.

The second input shaft 52 is also supported rotatably by bearings 92*a* and 92*b*. On this input shaft 52, from the right side of the drawing, disposed are a third speed clutch 63, a third speed drive gear 73*a,* a second speed drive gear 72*a,* a LOW drive gear 71*a,* a LOW clutch 61, a second speed clutch 62, and a third connection gear 83. The third speed drive gear 73*a,* the second speed drive gear 72*a* and the LOW drive gear 71*a* are each disposed rotatably on the second input shaft 52, and the third speed clutch 63, the second speed clutch 62, or the LOW clutch 61, which is actuated hydraulically, engages with the respective gear to connect it rotationally to the second input shaft 52. The third connection gear 83 is mounted on the second input shaft 52, at the left end thereof outside the bearing 92*a,* which supports the second input shaft 52 rotatably. In this condition, the third connection gear 83 and this end portion of the second input shaft 52 are supported only by this bearing 92*a* in cantilever.

The first counter shaft 53 is also supported rotatably by bearings 93*a* and 93*b*. On this counter shaft 53, from the right side of the drawing, disposed are a first last reduction drive gear 56*a*, a fourth speed driven gear 74*b*, a fifth speed driven gear 75*b*, a dog clutch 66, a reverse driven gear 76*c*, and a second connection gear 82. The first last reduction drive gear 56*a* and the fourth speed driven gear 74*b* are fixed on the first counter shaft 53, so these gears rotate with this counter shaft as a unified body. The fifth speed driven gear 75*b* and the reverse driven gear 76*c* are each disposed rotatably on the first counter shaft 53, and the dog clutch 66 is actuated axially in one direction to engage with the fifth speed driven gear 75*b* so as to connect it rotationally to the first counter shaft 53 or in the opposite direction to engage with the reverse driven gear 76*c* so as to connect it rotationally to the counter shaft 53. The second connection gear 82 is disposed rotatably on the first counter shaft 53, at the left end thereof outside the bearing 93*a*, which supports the first counter shaft 53 rotatably. In this condition, the second connection gear 82 and this end portion of the first counter shaft 53 are supported only by this bearing 93*a* in cantilever.

The second counter shaft 54 is also supported rotatably by bearings 94*a* and 94*b*. On this counter shaft 54, from the right side of the drawing, disposed are a second last reduction drive gear 56*b*, a third speed driven gear 73*b*, a second speed driven gear 72*b* and a LOW driven gear 71*b*, which are mounted fixedly.

As shown in the drawings, the LOW drive gear 71*a* meshes with the LOW driven gear 71*b*; the second speed drive gear 72*a* meshes with the second speed driven gear 72*b*; the third speed drive gear 73*a* meshes with the third speed driven gear 73*b*; the fourth speed drive gear 74*a* meshes with the fourth speed driven gear 74*b*; and the fifth speed drive gear 75*a* meshes with the fifth speed driven gear 75*b*. In addition, the reverse drive gear 76*a* meshes with a reverse idler gear (not shown), which then meshes with the reverse driven gear 76*c*. The first connection gear 81 meshes with the second connection gear 82, and the second connection gear 82, in turn, meshes with the third connection gear 83. Furthermore, both the first last reduction drive gear 56*a* and the second last reduction drive gear 56*b* mesh with a last reduction driven gear (a gear which has the same function as the last reduction driven gear 6*b* of the first embodiment shown in FIG. 1).

In this transmission, each of the five speed ratios of the forward drive range is established by selectively engaging a respective one of the LOW, second, third, fourth and fifth speed clutches 61~65 while the dog clutch 66 is engaged with the fifth speed driven gear 75*b* to connect it rotationally to the first counter shaft 53. For the reverse drive, the fifth speed clutch 65 is engaged while the dog clutch 66 is engaged with the reverse driven gear 76*c* to connect it rotationally to the first counter shaft 53. It should be noted that the fifth speed clutch 65 is also used as a reverse clutch for the establishment of the reverse drive range in this transmission in addition to the establishment of the fifth speed ratio for the forward drive range.

In this transmission, the rotational drive power which is input from the engine to the first input shaft 51 is transmitted simultaneously through a connection gear train 80 (which comprises the first, second and third connection gears 81, 82 and 83) to the second input shaft 52. For the output of the drive power, some gear trains with different speed ratios are disposed between the first input shaft 51 and the first counter shaft 53, and the other gear trains are disposed between the second input shaft 52 and the second counter shaft 54. With this arrangement of the rotational components, the axial length of the transmission is relatively short, so the transmission is made compact. Furthermore, because the third speed clutch 63 is positioned radially adjacent to the first last reduction drive gear 56*a* and to the second last reduction drive gear 56*b*, the space between the first and second last reduction drive gears 56*a* and 56*b*, which may otherwise become a dead space, is utilized for incorporating the third speed clutch 63 to improve the compactness of the transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 11-026009 filed on Feb. 3, 1999, which is incorporated here in by reference.

What is claimed is:

1. The parallel shaft transmission comprising:

a first input shaft, a second input shaft, and a counter shaft, which are disposed parallel with one another;

at least one set of first speed ratio gear train, each set including a first speed ratio drive gear which is disposed on said first input shaft and a first speed ratio driven gear which is disposed on said counter shaft, said first speed ratio drive gear and said first speed ratio driven gear meshing with each other;

at least one first clutching means which is disposed on said first input shaft, said first clutching means rotationally connecting and disconnecting said first speed ratio drive gear to and from said first input shaft, respectively;

at least one set of second speed ratio gear train, each set including a second speed ratio drive gear which is disposed on said second input shaft and a second speed ratio driven gear which is disposed on said counter shaft, said second speed ratio drive gear and said second speed ratio driven gear meshing with each other;

at least one second clutching means which is disposed on said second input shaft, said second clutching means rotationally connecting and disconnecting said second speed ratio drive gear to and from said second input shaft, respectively; and a connection gear train used for power transmission from said first input shaft to said second input shaft through a gear provided on an idle shaft which is disposed parallel with said first input shaft;

said parallel shaft transmission is a five speed ratio transmission;

said first speed ratio gear train comprises a fourth speed gear train and a fifth speed gear train;

said first clutching means comprises a fourth speed clutch and fifth speed clutch;

said second speed ratio gear train comprises a LOW gear train, a second speed gear train and a third speed gear train; and said second clutching means comprises a LOW clutch, a second speed clutch and a third speed clutch.

2. The parallel shaft transmission as set forth in claim 1, wherein:

said connection gear train comprises a first connection gear, a second connection gear, a third connection gear and a fourth connection gear;

said first connection gear is mounted on said first input shaft and meshes with said second connection gear;

said second connection gear and said third connection gear are disposed on said idle shaft and rotate together as a unified body; and said fourth connection gear is mounted on said second input shaft and meshes with said third connection gear.

3. The parallel shaft transmission as set forth in claim 1, wherein:

both one of said second clutching means and an output gear which is mounted on said counter shaft are positioned substantially on a plane which is perpendicular to the shafts.

4. The parallel shaft transmission as set forth in claim 1, further comprising:

a reverse gear train including a reverse drive gear, which is disposed on said first input shaft, and a reverse driven gear, which is disposed on said counter shaft, said reverse drive gear being rotationally connected with said reverse driven gear through a reverse idler gear, which rotates around a shaft that is provided parallel with said first input shaft; wherein:

said fourth speed gear train comprises a fourth speed drive gear and a fourth speed driven gear;

said reverse drive gear and said fourth speed drive gear are coupled with each other as one body and are disposed rotatably on said first input shaft, such that said reverse drive gear and said fourth speed drive gear are connected and disconnected rotationally to and from said first input shaft, respectively, by said fourth speed clutch;

said fourth speed driven gear and said reverse driven gear are each disposed rotatably on said counter shaft; and a dog clutch is provided on said counter shaft, such that said fourth speed driven gear and said reverse driven gear are selectively connected and disconnected to and from said counter shaft, respectively.

5. The parallel shaft transmission as set forth in claim 4, wherein:

either said fourth speed driven gear or said reverse driven gear is connected rotationally to said counter shaft by said dog clutch to establish a forward drive range (D range) or a reverse drive range (R range), respectively; and then said fourth speed clutch is engaged to establish a fourth speed ratio or a reverse speed ratio, correspondingly.

* * * * *